United States Patent [19]

Welch et al.

[11] 4,316,818

[45] Feb. 23, 1982

[54] POLYMERIZATION CATALYST AND PROCESS

[75] Inventors: Melvin B. Welch; Richard E. Dietz, both of Bartlesville, Okla.

[73] Assignee: Phillips Petroleum Company, Bartlesville, Okla.

[21] Appl. No.: 194,306

[22] Filed: Oct. 6, 1980

[51] Int. Cl.$^3$ .............................. C08F 4/64; C08F 4/02
[52] U.S. Cl. .............................. 252/429 B; 252/429 C; 526/124; 526/125
[58] Field of Search ........................ 252/429 B, 429 C

[56] References Cited

U.S. PATENT DOCUMENTS

| | | | |
|---|---|---|---|
| 3,642,746 | 2/1972 | Kashiwa et al. | 252/429 C X |
| 3,658,722 | 4/1972 | Delbouille et al. | 252/429 C |
| 3,859,231 | 1/1975 | Kochhar et al. | 252/429 B X |
| 3,888,789 | 6/1975 | Dombro et al. | 252/429 B |
| 4,006,101 | 2/1977 | Matsuura et al. | 252/429 C |
| 4,167,493 | 9/1979 | Hsieh | 252/429 B |
| 4,204,981 | 5/1980 | Invernizzi et al. | 252/429 B |
| 4,252,670 | 2/1981 | Caunt et al. | 252/429 B |

*Primary Examiner*—Patrick Garvin

[57] ABSTRACT

An active olefin polymerization catalyst is produced by halogenating magnesium oxide, contacting the halogenated magnesium oxide product with an alcohol, and treating the product thus produced with a titanium tetrahalide to obtain the catalyst. The catalyst can be combined with a cocatalyst component comprising a metallic hydride or an organometallic compound, e.g., an organoaluminum compound, in the polymerization process.

13 Claims, No Drawings

POLYMERIZATION CATALYST AND PROCESS

BACKGROUND OF THE INVENTION

This invention relates to new polymerization catalysts, a process for preparing the catalysts, and use of the catalysts for the homopolymerization and copolymerization of olefins. In another aspect, this invention relates to a catalyst prepared by halogenating magnesium oxide, followed by treatment with an alcohol and a titanium tetrahalide. In another aspect, this invention relates to the formation of a catalyst as defined above which can be used with a cocatalyst comprising a metallic hydride or an organometallic compound to form a catalyst system useful for the polymerization of alpha-olefins. In a further aspect, this invention relates to a process for polymerizing alpha-olefins using a catalyst system wherein a first catalyst component is prepared by halogenating magnesium oxide, then treating the halogenated product with an alcohol and a titanium tetrahalide.

It is known to polymerize alpha-olefins and mixtures thereof in a low pressure process wherein organometal catalysts used are prepared from mixtures of compounds of elements of Subgroups IV–VI of the Mendeleev Periodic Table and the organometallic compounds of the elements of Groups I–III of the Periodic Table. The polymerization is generally carried out in suspension, in solution, or even in a gaseous phase.

The activity of an olefin polymerization catalyst is one important factor in the continuous search for a catalyst useful for the polymerization of alpha-olefins. It is also desirable that the process used in forming the catalyst be such as to allow ease in preparation and to allow control over the final catalyst formed. It is also desirable to produce titanium-based catalysts that comprise chiefly an inert support, which is not harmful when left in the polymer. It is also advantageous to prepare a polymer containing low amounts of residual catalyst materials whereby deashing of the produced polymer can be eliminated and a simple deactivation of the residual catalyst is all that is required. The present invention relates to an improved catalyst exhibiting increased activity and possessing some of the above-mentioned advantages.

Accordingly, an object of this invention is to provide an improved polymerization catalyst.

Another object of this invention is to provide a process for preparing a novel catalyst.

Another object of this invention is to provide an improved process for the polymerization of alpha-olefins.

Other objects, aspects, and the several advantages of this invention will be apparent to those skilled in the art upon a study of this disclosure and the appended claims.

SUMMARY OF THE INVENTION

In accordance with the invention, an active olefin polymerization catalyst is produced by halogenating magnesium oxide (MgO), contacting the halogenated magnesium oxide with an alcohol, and treating the thus produced product with a tetravalent halogenated titanium compound to obtain an olefin polymerization catalyst.

Further, in accordance with the invention, the catalyst produced as defined above is combined with a cocatalyst comprising a metallic hydride or an organometallic compound wherein the metal is selected from Groups IA, IIA, and IIIA of the Periodic Table to form an active olefin polymerization catalyst.

Further, in accordance with the invention, the catalyst produced as defined above is used in the polymerization of alpha-olefins.

In a specific embodiment of the invention, an active olefin polymerization catalyst is produced by contacting magnesium oxide at an elevated temperature with a halogenating agent such as HX, $X_2$, $CX_4$, and the like, where X is a halogen, treating the halided product with a monohydric alcohol at a temperature lower than employed in the haliding step, and contacting the product thus formed with a titanium tetrahalide to form a catalyst component (component A). The catalyst component A can be washed with a dry hydrocarbon to remove unreacted titanium compound and dried, if desired, to obtain the catalyst of this invention.

The catalyst (component A) can be used with an organometallic cocatalyst (component B) such as an organoaluminum compound, to form a catalyst system that is used to polymerize alpha-olefins, such as ethylene, or mixtures of olefins, such as ethylene, admixed with a higher 1-olefin. Normally solid polymers are recovered from the polymerization and converted into film, molded articles, and the like, by means of extrusion, blow molding, etc.

The first step of preparing the catalyst comprises haliding the magnesium oxide support. The magnesium oxide is preferably in finely divided or particulate form, previously dried, and of relatively high purity. The magnesium oxide is generally sized so that it can be contacted under fluidizing conditions although fixed bed or other contacting can also be effected. The halogenating agent is selected from compounds which are liquid or gaseous under the reaction conditions and which can react with magnesium oxide so that the halogen atoms become bnded to the metal. Suitable halogenating agents that can be used have the formula HX, $X_2$, $CX_4$, and the like, where X is a halogen. Specific halogenating agents that are suitable include hydrogen chloride, hydrogen bromide, hydrogen iodide, hydrogen fluoride, fluorine, iodine, carbon tetrachloride, and the like.

The haliding of magnesium oxide (support) can be accomplished over a wide range of temperatures with the operating temperatures ranging from 150° C. to about 600° C. and with pressures ranging from about 10 psia (69 kPa) to about 1000 psia (6.9 MPa). The haliding is usually accomplished by passing heated vapors of the halogenating agent over the support which can be fluidized. It is also contemplated that the haliding of the support (MgO) can be effected by passing the halogenating agent in the form of a gas over the support while the halogenating agent is admixed with a carrier gas such as air, argon, nitrogen, helium, and the like.

The amount of halogen (X) combined with the magnesium of the support composition can vary appreciably but generally the atomic ratio of X to magnesium will be between 0 and 1.

The halogenated magnesium oxide is treated with an alcohol under conditions and for a period of time sufficient to further modify the catalyst. The alcohols generally used to react with the halogenated magnesium oxide are monohydric alcohols. The preferred alcohols can be expressed as ROH in which R is a straight chain or branched chain alkyl group containing from 1 to about 20 carbon atoms. Exemplary compounds include methanol, ethanol, n-butanol, 2-ethylhexanol-1, 2,3-dimethylbutanol-2, 2-methyl-3-ethylpentanol-3, dodecanol-1, eicosanol-1, and the like. Methanol is a convenient alcohol to use because of its ready availability in purified form.

The amount of alcohol associated with the halogenated magnesium oxide on a per mole basis can range from 0.1 mole to about 2 moles.

Treatment of the halogenated metal oxide with alcohol can be accomplished under fluidized, fixed bed, or by other contacting techniques, over a wide range of temperatures with operating temperatures ranging from 50° C. to about 400° C. and the pressures ranging from about 10 psia to about 1000 psia. Generally, the temperature for treatment with the alcohol is carried out at a temperature lower than that used for haliding of the magnesium oxide. Contact of the halogenated magnesium oxide with alcohol is usually accomplished by passing vapors of the alcohol over the halogenated support at an elevated temperature or by contact of the halogenated support with the alcohol as a mixture with an inert material. Thus, it is contemplated that treatment of the halogenated support with alcohol can be effected by passing the alcohol in the form of a gas over the support while the alcohol is admixed with a carrier gas comprising inert materials such as argon or nitrogen.

The product obtained after treating the halogenated magnesium oxide particulate solid mixture with an alcohol is usually contacted after cooling with a tetravalent halogenated titanium compound under contacting conditions sufficient to provide the desired catalyst component (A). Any suitable tetravalent, halogenated titanium compound can be used as long as the titanium has one halogen attached thereto. Suitable compounds can be represented by the formula $TiX_a(OR')_{4-a}$ in which X stands for bromine, chlorine or iodine or mixtures thereof, a is an integer of 1 to 4 and R' is an alkyl, cycloalkyl or aryl group and combinations thereof, such as alkaryl, containing from 1 to about 20 carbon atoms. Specific examples of suitable compounds include titanium tetrachloride, titanium dibromodichloride, titanium iodotrichloride, n-butoxytrichlorotitanium, chlorotridodecyloxytitanium, bromotricyclohexyloxytitanium, diphenoxydichlorotitanium, and the like. A presently preferred compound is titanium tetrachloride because of availability and relatively low cost.

The contacting can be carried out generally at temperatures in the range of about 0° C. to about 150° C. with the decomposition temperature of the tetravalent halogenated titanium compound determining the limits. The length of the contacting period can vary greatly depending upon the method of contacting with the period of time generally ranging from about 0.05 to about 20 hours.

The contacting can be carried out neat or in hydrocarbon solution. Suitable hydrocarbons, which are inert in the process, include paraffins, cycloparaffins and aromatic hydrocarbons, e.g., n-pentane, n-hexane, n-heptane, methylclohexane, cyclohexane, benzene, toluene, xylenes, and the like.

The mole ratio of magnesium (based on initial magnesium oxide) to titanium compound can range from about 0.05:1 to 1:1. Excess titanium compound is removed by contacting the reaction product with a hydrocarbon inert in the process, e.g., a paraffin, cycloparaffin or aromatic hydrocarbon.

The formed catalyst, component A, can be combined with a cocatalyst, component B, to form a catalyst system useful for the polymerization of olefins. Component B is a hydride or an organometallic compound wherein said metal is selected from an element of Groups IA, IIA and IIIA of the Periodic Table. In other words, component B can be a hydride of the metals of Groups IA, IIA and IIIA or an organo-compound of the metals. The preferred compound to be used as component B is an organoaluminum compound which can be represented by the formula $AlR''_bY_{3-b}$ in which R'' is the same or different hydrocarbon radical selected from such groups as alkyl, cycloalkyl, aryl, alkaryl, and the like, having from 1 to about 12 carbon atoms per molecule, Y is a monovalent radical selected from among the halogens and hydrogen, and b is an integer of 0 to 3. Specific examples of organoaluminum compounds include trimethylaluminum, triethylaluminum, tridodecylaluminum, tricyclohexylaluminum, triphenylaluminum, tribenzylaluminum, diethylaluminum chloride, diisobutylaluminum hydride, ethylaluminum dibromide, and the like.

Any alpha-olefin, or mixture thereof, can be polymerized in the presence of the catalyst of the present invention with the preferred reactant being ethylene or ethylene plus another higher aliphatic mono-1-olefin containing from 3-10 carbon atoms. Preferably, the normally solid polymer prepared will contain from about 90 to 100 wt. % ethylene. The alpha-olefin is polymerized by contact with the catalyst system of this invention in solution, in suspension or in gaseous phase at temperatures ranging from about 20°–200° C., more preferably from about 50° C. to about 120° C., and pressures ranging from about atmospheric to about 1000 psia (6.9 MPa). The homopolymerization and copolymerization reactions can be conducted batchwise or in continuous fashion by employing any known process.

It is convenient when polymerizing ethylene in a bench scale process, for example, to conduct the polymerizaton batchwise in a stirred reactor employing a dry hydrocarbon diluent inert in the process such as isobutane, n-heptane, methylcyclohexane, benzene, toluene, and the like, at a reactor temperature of about 80° C. and a reactor pressure (ethylene plus diluent and hydrogen, if used) of about 300 psia (2.1 MPa). Ethylene is admitted to the reactor as required to maintain the desired pressure. Molecular weight control agents such as hydrogen, can be employed in the reactor as known in the art to adjust the molecular weight of the polymer.

When the selected polymerization time is reached, the reaction can be terminated by discontinuing the flow of ethylene and comonomer, if used, venting unreacted monomer(s) and diluent and recovering the polymer. The recovered product can be treated to deactivate or remove catalyst residues such as by an alcohol wash, can be stabilized by admixture with an antioxidant(s) and can be dried to remove residual solvent, if present, as is known in the art. The final product can be further processed into pellets and/or converted into the final shaped product.

The following examples are set forth as illustrative of this invention and are not meant to be restrictive in any way.

EXAMPLE I

Catalyst Preparation

Catalyst A (Invention): 15 g (0.37 mole) MgO was fluidized in a 48 mm O.D. quartz tube surrounded by an electrically heated furnace. An air flow rate of about 40 liters per hour was employed. The tube and contents were heated to 427° C. as fluidizing continued and at that temperature, air saturated with CCl₄ at room temperature, e.g., 25° C., was substituted for the fluidizing gas. The treatment with the air-CCl₄ mixture was continued for 3 hours. Then the temperature was reduced to 316° C. using nitrogen as the cooling and fluidizing means. Nitrogen, saturated with methanol at 25° C., was then used to treat the MgO-CCl₄ product for 3 hours at 316° C. The resulting product was recovered and refluxed in about 200 g of n-hexane containing 69 g of TiCl₄ for 1 hour. The final product was recovered by filtration, washed with about 200 g of n-hexane and about 200 g of n-pentane and dried over a hot water bath to yield 22.5 g of a yellowish powder as catalyst A.

Catalyst B (Invention): 15 g (0.37 mole) MgO was treated for 3.5 hours at 317° C. with air saturated with CCl₄ at 25° C. as in the manner of catalyst A. The resulting product was recovered, cooled to room temperature, and 10.5 g of it was treated under refluxing conditions with a mixture containing 0.40 g of methanol and about 200 g of n-hexane. The solid material was recovered, suspended in a mixture containing about 200 g of n-hexane and 69 g of TiCl₄, and the mixture refluxed for 1 hour. The final product was recovered, washed with n-hexane and dried as before to give 9.1 g of a yellowish powder as catalyst B.

Catalyst C (Control): 15 g (0.37 mole) of MgO was treated for 2 hours at 427° C. with air saturated with CCl₄ at 25° C., then was treated for 2 hours at 316° C. with nitrogen saturated with methanol at 25° C. as in the manner of catalyst A. While still at 316° C., nitrogen was substituted for the nitrogen-methanol stream until the remaining methanol was purged from the system. At that time, the nitrogen stream was injected with 3, 1.7 g portions of TiCl₄, allowing each portion to be swept through the system before injecting the next. About 1 hour was consumed with this phase of the treatment. The product was recovered (partially) and cooled to yield a whitish powder as catalyst C.

Catalyst D (control): 10 g (0.25 mole) of dry MgO was charged to a flask along with about 160 g of methanol and 69 g of TiCl₄. The stirred slurry was refluxed for 2 hours, stirring discontinued and the contents allowed to cool to about 25° C. The mother liquor was decanted and the slurry washed and dried as before to yield 8.6 g of a whitish powder as catalyst D.

EXAMPLE II

Ethylene Polymerization

A 3.8 liter, stirred, stainless steel reactor, after cleaning and drying, was purged with isobutane vapor. In each run, in order, was charged 3 mL of a 15 wt. % solution of triethylaluminum (TEA) in n-heptane unless specified otherwise and the solid catalyst. The reactor was sealed, 2 liters of isobutane was pressured in with nitrogen and the reactor was adjusted to the 80° C. or 100° C. reaction temperature to be used. Ethylene was then admitted to maintain a constant partial pressure above the partial pressure of the isobutane during the run. At the end of the one hour polymerization run, the ethylene flow was stopped and the reactor vented. The polymer was recovered, air dried, and weighed. The amounts of catalysts and cocatalysts employed, conditions used and results obtained are given in Table 1.

TABLE 1

| | | | | | | | | |
|---|---|---|---|---|---|---|---|---|
| | | | Ethylene Polymerization | | | | | |
| Run | Catalyst | | TEA | Reactor Temp. | Pressures, MPa | | | Polymer Yield g | Productivity g/g/hr |
| No. | No. | Wt. g | mL | °C. | H₂ | C₂= | Total | | |
| 1 | A | 0.0793 | 3 | 80 | 0 | 0.69 | 1.9 | 242 | 3050 |
| 2 | B | 0.0574 | 3 | 80 | 0 | 0.69 | 1.9 | 105 | 1830 |
| 3 | C | 0.0534 | 3 | 80 | 0 | 0.69 | 1.9 | tr | — |
| 4 | D | 0.0793 | 0.5 | 80 | 0 | 0.69 | 1.9 | 77 | 971 |
| 5 | D | 0.0954 | .5 | 100 | 0.34 | 1.4 | 3.9 | 28 | 295 |

Notes:
C₂= means ethylene
tr means trace
Productivity is in terms of g polymer per g catalyst per hour. Runs 1,2 are invention runs; 3–5 are controls.
Productivity in run 3 was not calculated.

Inspection of the results for invention runs 1, 2 indicates that the catalysts are active polymerizaton catalysts compared to the substantially less active control catalysts employed in runs 3-5. The preparation of catalyst C (control) differs from the invention catalysts in that the MgO product obtained after treating with CCl₄ and methanol is contacted under fluidizing conditions without cooling before addition of TiCl₄. It is believed that fluidized conditions allows insufficient time for reactant contacting. Catalyst D (control) differs from the invention catalysts in omitting the halide treatment.

Invention catalyst A is more active than invention catalyst B, thus the method employed in its production represents a preferred embodiment.

We claim:

1. A catalyst for the homopolymerization and copolymerization of alpha-olefins characterized as the product obtained by
   (a) reacting finely divided magnesium oxide at an elevated temperature with a halogenating agent,
   (b) treating the particulate product obtained in (a) with a monohydric alcohol, and
   (c) contacting the particulate product formed in (b) with a tetravalent halogenated titanium compound at a temperature and for a period of time sufficient to form a catalyst component (A).

2. A catalyst according to claim 1 wherein catalyst component A is combined with a cocatalyst component (B) comprising a metallic hydride or organometallic compound wherein said metal is selected from Groups IA, IIA, and IIIA of the Mendeleev Periodic Table.

3. A catalyst according to claim 1 wherein said halogenating agent is selected from HX, X₂, and CX₄, where X is a halogen and said titanium compound is titanium tetrachloride.

4. A catalyst according to claim 2 wherein said halogenating agent is selected from HX, X₂, and CX₄, where X is a halogen, said titanium compound is titanium tetrachloride, and cocatalyst component B is an organoaluminum compound.

5. A catalyst according to claim 1 wherein the mole ratio of magnesium oxide to titanium compound is in the range of 0.05:1 to 1.1:1.

6. A catalyst according to claim 1 wherein said halogenating agent is carbon tetrachloride, said alcohol is methanol, and said titanium compound is titanium tetrachloride.

7. A catalyst according to claim 5 which additionally contains triethylaluminum.

8. A method of preparing a catalyst component A comprising
   (a) reacting finely divided magnesium oxide with a halogenating agent under halogenating conditions including an elevated temperature and for a period of time sufficient to form a halogenated magnesium oxide product,
   (b) treating the particulate product obtained in (a) with a monohydric alcohol,
   (c) contacting the particulate product obtained in (b) with a tetravalent halogenated titanium compound at a temperature and for a period of time sufficient to form an active catalyst component, and
   (d) washing the titanium contacted product obtained in (c) with an inert solvent to remove unreacted titanium compound.

9. A method according to claim 8 wherein said reacting in (a) is carried out by contacting magnesium oxide with a halogenating agent and an oxygen-containing gas at a temperature in the range of 100° C. to 600° C.;
   said product of (a) is treated with said alcohol in admixture with an inert carrier gas; and
   said contacting in (c) is carried out by refluxing with said titanium compound in an inert hydrocarbon solvent.

10. A catalyst prepared according to claim 8 which is combined with a cocatalyst component B comprising a metallic hydride or organometallic compound wherein said metal is selected from Groups IA, IIA, and IIIA of the Mendeleev Periodic Table.

11. A process according to claim 8 wherein said halogenating agent is carbon tetrachloride, said alcohol is methanol, and said titanium compound is titanium tetrachloride.

12. A process according to claim 11 which catalyst additionally contains triethylaluminum.

13. A process according to claim 8 wherein the product obtained in step (a) is cooled before contacting with alcohol in step (b) and the product obtained in (b) is further cooled before contacting with said titanium compound in (c).

* * * * *